United States Patent [19]

Gagnon

[11] Patent Number: 4,489,125
[45] Date of Patent: Dec. 18, 1984

[54] BATT-ON-MESH PRESS FELT HAVING INCREASED ABRASION RESISTANCE, BATT RETENTION AND DIMENSIONAL STABILITY

[75] Inventor: Yvon P. Gagnon, Wilson, N.C.

[73] Assignee: Porritts & Spencer, Inc., Wilson, N.C.

[21] Appl. No.: 562,073

[22] Filed: Dec. 16, 1983

[51] Int. Cl.³ .............................................. B32B 5/02
[52] U.S. Cl. ................................. 428/235; 139/383 A; 156/148; 162/DIG. 1; 428/234; 428/255; 428/257; 428/258; 428/259; 428/280; 428/300
[58] Field of Search ............... 428/234, 235, 300, 257, 428/258, 259, 247, 255, 267, 280; 139/383 A; 162/DIG. 1; 156/148; 28/107, 112

[56] References Cited

U.S. PATENT DOCUMENTS

| | | |
|---|---|---|
| 3,739,567 | 6/1973 | Williamson .......................... 428/395 |
| 4,259,394 | 3/1981 | Khan ..................................... 428/257 |
| 4,414,263 | 11/1983 | Miller et al. ......................... 428/257 |

*Primary Examiner*—James J. Bell
*Attorney, Agent, or Firm*—Fleit, Jacobson, Cohn & Price

[57] ABSTRACT

A batt-on-mesh press felt having improved abrasion resistance, batt retention, and dimensional stability comprising a fibrous batt in combination with a woven mesh base. The woven mesh base comprises an ionomer resin-encapsulated nylon yarn in the cross-machine direction and nylon yarn in the machine direction.

15 Claims, 4 Drawing Figures

BATT-ON-MESH PRESS FELT HAVING INCREASED ABRASION RESISTANCE, BATT RETENTION AND DIMENSIONAL STABILITY

BACKGROUND OF THE INVENTION

1. Field of the Invention

This invention is directed to a papermakers' press felt of the batt-on-mesh type having increased abrasion resistance, batt retention, and dimensional stability. More particularly, the invention is directed to the woven mesh base which comprises nylon yarn in the machine direction and nylon yarn encapsulated with ionomer resin in the cross-machine direction.

2. Description of the Prior Art

Press felts are commonly used for supporting and draining papermaking material during the papermaking process. In recent years, changes in the industry-wide practice of papermaking have placed greater demands upon the press felts. Primary among these changes are increased roll speed, greater use of conditioning equipment, and greater roll pressures. These same changes now require that the current papermakers' felt have a surface fine enough to produce a smooth finish, open enough to allow water to drain quickly, and resilient enough to quickly recover from repeated high nip pressures. Very importantly, these press felts must be constructed of materials which allow for improved batt retention, abrasion resistance, and dimensional stability.

Batt-on-mesh needled felts which consist of a batt of fibrous material needled to a woven mesh base are well known in the art and possess several characteristics required by the industry. The smooth surface and high drainage characteristics of these felts have been responsible for their extensive use throughout the papermaking industry.

However, these batt-on-mesh needled felts are not without their own problems. One problem is that the abrasive action of the press rolls causes the batt surface to shed fibers after a relatively short period of use. Another problem is that the increased use of the various types of conditioning equipment required to keep the felts clean also cause abrasion and fiber shedding. This has an adverse effect on the dimensional stability and the efficiency of current felts.

One effort to improve the abrasion resistance of the mesh base of a papermakers' felt is disclosed by Bond, U.S. Pat. No. 4,370,375. Bond provides a woven, heat set, papermakers' felt comprising machine and cross-machine direction thermoplastic filaments. At least 25% of the cross-machine direction filaments are oriented polyamide monofilaments having a diameter of about from 5 to 30 mils, these polyamide monofilaments including 3–10 weight percent, based on the total weight of the filament, of molybdenum disulfide. Among the disadvantages of the disclosure of Bond is that the molybdenum disulfide must be blended with the nylon prior to formation of the nylon fiber.

Prior art methods for improving the dimensional stability of the mesh base of papermakers' felts include forming the mesh with metal warps. This practice fell into disuse because the metal strands are subject to damage as a result of crinkling or creasing during shipping and installation. Additionally, such belts have low flexural fatigue resistance as compared to synthetic belts. Fleischer, U.S. Pat. No. 4,093,512, discloses a papermakers' mesh for use in papermaking machines comprising ultrahigh modulus, load-bearing yarn having a modulus of elasticity greater than 150 grams per denier in the machine direction. Included in the Fleischer disclosure is the concept of resin coating or wrapping and then resin coating the ultrahigh modulus yarns to improve their abrasion resistance and degradation resistance. Asbestos, nylon, and polyester are disclosed as contemplated wrapping materials; while nylon resins, water-based acrylics, phenolic resins, and amine resins are disclosed as suitable coating resins. The only fiber actually disclosed in the reference is a poly (para-phenylene terephthalamide).

Khan, U.S. Pat. No. 4,259,394, discloses a base fabric utilized in conjunction with a needled batt, the base fabric comprising interwoven core-wrapped yarns, the core yarns of which are effectively heat-infusible and the wrapping yarns effectively heat-fusible. Disclosed as the infusible yarns are aramid fibers, acrylic homopolymers, coated fiberglass, metalic fibers, and novoloid fibers. Disclosed as fusible materials are polyamide, polyester, polyolefin, and polyvinylchloride.

None of the prior art suggests the use of ionomer-coated nylon fibers as the cross-machine direction element of a woven mesh which forms the base layer of a batt-on-mesh papermakers' felt.

Thus, a need has continued to exist for a papermakers' press felt of the batt-on-mesh type which is smooth, has good drainage characteristics, and has improved abrasion resistance, batt retention, and dimensional stability.

SUMMARY OF THE INVENTION

It is an object of this invention to provide a papermakers' press felt of the batt-on-mesh type. It is a further object of this invention to provide a batt-on-mesh press felt having increased abrasion resistance.

It is yet a further object of this invention to provide a batt-on-mesh press felt having increased dimensional stability.

It is still a further object of this invention to provide a batt-on-mesh press felt having improved batt retention.

These and other objects of the invention, as will hereinafter become more readily apparent, have been accomplished by a press felt comprising a fibrous batt and a woven mesh base, said woven mesh base comprising nylon yarn in the machine direction and ionomer resin-encapsulated nylon yarn in the cross-machine direction.

DESCRIPTION OF THE PREFERRED EMBODIMENT

Figure 1:
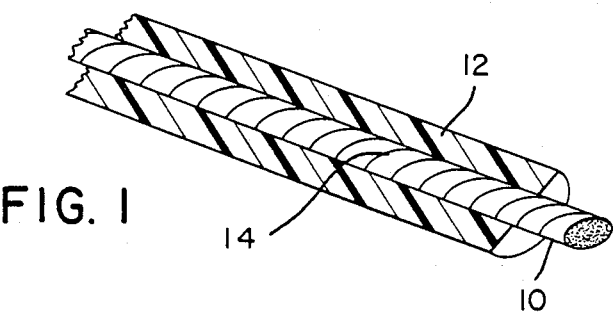
FIG. 1 is a perspective view, partially cut away, of a nylon yarn coated with an ionomer resin.

With reference to FIG. 1, the nylon yarn which is coated with ionomer resin is generally designated as 10. Suitable nylons include, but are not limited to, polycaprolactam, polyhexamethylene adipamide, and polyhexamethylene dodecanoamide. The aforementioned are merely representative, and this invention includes within its scope all polyamides having the physical properties known to be required by the demands of press felts.

Included within the contemplation of this invention are monofilament, multifilament, and cabled monofilament nylon yarns. Typical yarns suitable for the practice of this invention include, but are not limited to, 210/3, 420/3 and 840/3 denier nylon multifilaments suitably twisted with, for example, about 8 to 12 twists per inch in singles and about 5 to 8 twists per inch in the plys, nylon monofilaments having diameters in the range of about 0.008" to about 0.015", and 0.008/2/2 and 0.008/2/3 cabled monofilaments, twisted with about 5 to 7 twists per inch in ply and about 3 to 5 twists per inch in the cable.

The ionomer resin coating 12 on the nylon yarn 10 is a metal salt of a copolymer of ethylene and a vinyl monomer containing an acid group. Typical monomers which are copolymerized with ethylene include acrylic acid and methacrylic acid. These copolymers exist as the metal salts. The unique properties of ionomer resins are to a great extent dependent on the presence of the strong interchain forces in the long chain molecules of the polymer structure. These interchain forces are developed between ionized carboxyl groups pendent from the polymeric chains. Metallic ions, such as sodium, potassium, calcium, magnesium and zinc, are associated with the ionized carboxyl sites to provide a thermally reversible interchain linkage. This interchain bonding develops properties normally associated with a crosslinked structure. However, since the ionic links are thermally reversible, these polymers may be processed at conventional temperatures in standard plastics processing equipment. These ionomer resins are well known to the art and commercially available under the trade name "Surlyn" from E.I. De Pont de Nemours & Company, Inc., the ionomer formulations being available in a broad, complex range of compositions. Surlyn 9720 is the preferred ionomer resin for the purposes of this invention.

The ionomer coating may be applied to the nylon fiber by various coating techniques known in the art. The preferred coating technique is by extrusion coating, with cross head extrusion the most preferred coating method. In this method, a tubing dye is used in the cross head to facilitate splice transfer to allow continuous running of one yarn supply package to another. In one embodiment of the coating process, vacuum is applied to the dye to draw the coating down upon the yarn while coating progresses. This effect is not critical since the ionomer possesses the property of later shrinking down upon the yarn substrate during heat treatment of the finished wet felt, thereby yielding a tight mechanical bond between the coating and the substrate.

Upon heating, the ionic bonding forces of the ionomer resin coating are greatly reduced, thereby enabling the material to be easily processed, especially for crosshead extrusion yarn coating which requires high throughput speeds of the substrate to maintain favorable economics.

The ionomer resin-coated nylon yarn 14 typically has a diameter in the range of about 18 to 35 mils and contains ionomer resin in the range of about 50–80%, based on the weight of the nylon yarn.

Figure 2:
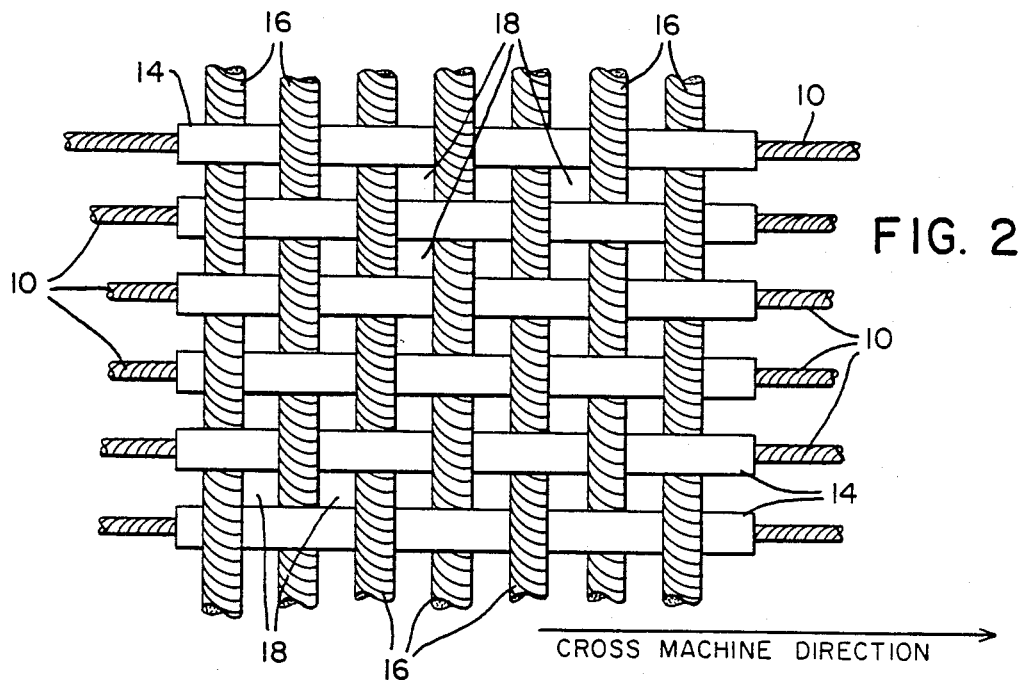
FIG. 2 is a top plan view of a plain weave mesh layer in accordance with this invention.

Techniques for fabricating woven mesh base from nylon yarn are well known in the art. Any of the conventional weaving patterns known in the art are contemplated as within the scope of this invention. FIG. 2 shows a top plan view of a plain weave mesh layer 16 comprising nylon yarn 10 in the machine direction and ionomer resin-encapsulated nylon yarn 14 in the cross-machine direction. The nylon yarn comprising the machine direction yarn and the core yarn for the cross-machine yarn may be the same or different. Typical weave patterns include, but are not limited to, plain weave, satin weave, broken twill, and the like.

Figure 3:
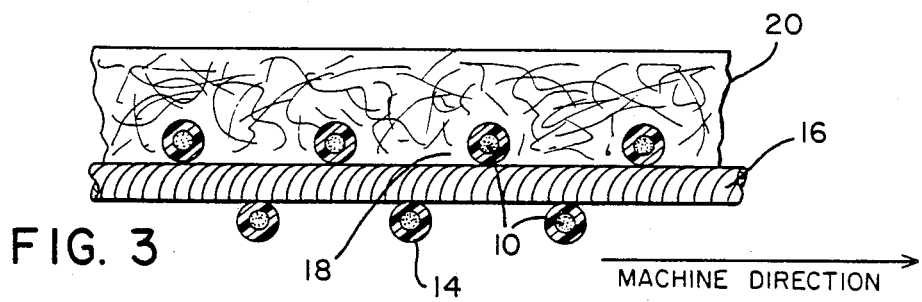
FIG. 3 is a sectional view of a papermakers' press felt, taken in the machine direction, in accordance with this invention.
Figure 4:
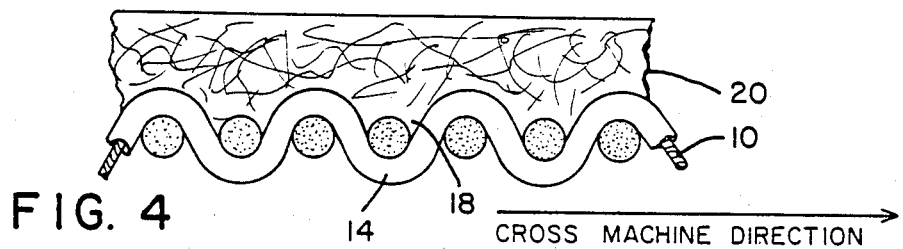
FIG. 4 is a sectional view, taken in the cross-machine direction, of a papermakers' felt in accordance with this invention.

FIGS. 3 and 4 are sectional views, taken in the machine direction and cross-machine direction, respectively, of typical press felts of this invention. The fibrous batt material 18 includes, but is not limited to, natural fibers such as wool and synthetic fibers such as nylon, polyester, and the like. Also contemplated are combinations of synthetic and natural fibers. The fibrous batt material is attached to the mesh base by a conventional needling process well known in the art. During the course of the needling operations, small amounts of the fibrous batt 18 are punched through the ionomer resin-encapsulated nylon yarn 14 and the nylon yarn 10.

Subsequent to the needling process, the needled batton-mesh felt is subjected to a heat treatment. The heat treatment process is well known in the art. Typical heat treatment conditions will consist of either a hot roll treatment, infra-red treatment, or hot air oven treatment. Temperatures of the heat treatment are adjusted to cause the ionomer coating to soften without flowing. At the same time, the machine direction yarn is maintained under tension, thereby causing crimping in the cross-machine direction yarn.

The ionomer resins according to this invention provide properties to the encapsulated nylon yarn which make such yarn especially well suited for the production of woven mesh bases for press felts. In particular, the ionomer resin provides an element of abrasion resistance which is heretofore unknown in press felt mesh bases. Accordingly, press felts utilizing fabrics according to this invention demonstrate far superior useful life as compared to the prior art press felts.

Additionally, the ionomer resin has a relatively low melting point. The relatively low melting point permits the ionomer resin, during the heat treatment, to soften and melt around the fibrous batt which has penetrated the resin during the needling process and, upon cooling, to solidify and permanently lock the entire felt structure together, including the uncoated yarn in contact with the resin, thereby resulting in increased dimensional stability. Additionally, in spite of its relatively low melting point, this low melting point at least partially a function of the breakdown in ionic bonding resulting from the heating process, the extruded ionomer resin on the core yarn does not flow when melting occurs. Thus the coated yarn not only retains its shape, but the crimping of the cross-machine direction yarn which occurs during the melting process is retained on a permanent basis upon cooling.

A further advantage of this invention resides in the use of the ionomer resin-coated nylon yarn in the cross-machine direction only. The degree of fusion between the machine direction yarn and cross-machine direction yarn is kept at a minimum, thereby allowing the total felt structure to more easily conform to the press run distortion. During operation, felts are subjected to varying tensions at different points in the press section. A properly operating felt will conform, stretching and recovering without wrinkling. A felt that is too stiff or too soft will not provide the necessary dimensional stability.

Having generally described the invention, a better understanding can be obtained by reference to the following specific example, which is provided herein for purposes of illustration only and is not intended to be limiting unless otherwise specified.

THE EXAMPLE

In a preferred embodiment of the disclosed invention, the felt comprises a plain weave pattern of an ionomer-coated 210/3 denier multifilament type 832 nylon yarn with 12 twists per inch in the singles and 6 twists per inch in the ply, 16 ends per inch, in the cross-machine direction and an 840/3 denier multifilament type 715 nylon yarn having 16.3 twists per inch in the singles and 8.5 twists per inch in the ply, 15 picks per inch, in the machine direction. The batt is 100% 15 denier, 3½" staple weighing 1.2 ounces per square foot and is needled to the felt using conventional needling techniques.

Having now fully described the invention it will be apparent to one of ordinary skill in the art that many changes and modifications can be made thereto without departing from the spirit and scope of the invention as set forth herein.

What is claimed is:

1. A press felt comprising a woven mesh base and a fibrous batt disposed thereon, said woven mesh base comprising nylon yarn in the machine direction and ionomer resin-encapsulated nylon yarn in the cross-machine direction.

2. The press felt of claim 1 wherein said nylon yarn is selected from monofilament, multifilament, or cabled monofilament yarn.

3. The press felt of claim 1 wherein said nylon yarn in the machine direction is a multifilament nylon yarn and wherein said ionomer resin-encapsulated nylon yarn in the cross-machine direction is a multifilament nylon yarn.

4. The press felt of claim 1 wherein said fibrous batt is selected from natural fibrous materials, synthetic fibrous materials, or mixtures of natural fibrous materials and synthetic fibrous materials.

5. The press felt of claim 1 wherein said fibrous batt is needled to said woven mesh base.

6. The press felt of claim 1 wherein the ionomer resin is a metal salt of an ethylene-vinyl carboxylic acid copolymer.

7. A press felt comprising a mesh base, said mesh base comprising nylon yarn in the machine direction and ionomer resin-encapsulated nylon yarn in the cross-machine direction and a fibrous batt disposed on said mesh base, a portion of the fibers of said fibrous batt penetrating the ionomer resin of said ionomer resin-encapsulated nylon yarn and being permanently locked thereto by a heating step, said heating step causing the ionomer resin to soften and melt around the fibers which have penetrated it.

8. A press felt comprising a mesh base and a fibrous batt disposed thereon, said mesh base comprising nylon yarn in the machine direction and nylon yarn encapsulated with ionomer resin in the cross-machine direction, the cross-machine direction ionomer resin-encapsulated nylon yarn including crimping.

9. A method of producing a press felt comprising needling a fibrous batt to a woven mesh base, said woven mesh base comprising nylon yarn in the machine direction and ionomer resin-encapsulated nylon yarn in the cross-machine direction, and heat treating the resulting press felt.

10. The method of claim 9 wherein, during the needling process, a small portion of the fibrous batt material is punched through the machine direction yarn and the cross-machine direction yarn.

11. The method of claim 10 wherein the heat treatment of the press felt is sufficient to melt the ionomer resin, thereby, upon cooling, locking the fibrous batt material to the ionomer-encapsulated cross-machine direction yarn.

12. The method of claim 9 wherein the cross-machine direction yarn is permanently crimped by the heat treatment.

13. A method of producing a press felt comprising:
(1) encapsulating nylon yarn with an ionomer resin;
(2) weaving a base comprising nylon yarn in the machine direction and the ionomer encapsulated nylon yarn of (1) in the cross-machine direction;
(3) needling a fibrous batt to the fabric of (2), whereby a small portion of the fibrous batt is punched through both the machine direction nylon yarn and the cross-machine direction ionomer resin-encapsulated nylon yarn;
(4) heat treating (3) to melt the low-melting ionomer resin, followed by cooling, whereby the fibrous batt material punched through the cross-machine direction ionomer encapsulated nylon yarn becomes locked to said cross-machine direction ionomer encapsulated nylon yarn.

14. The method of claim 13 wherein the machine-direction nylon yarn and the cross-machine direction ionomer resin-encapsulated nylon yarn are the same, or different, and each is selected from monofilament, multifilament, or cabled monofilament yarn.

15. The method of claim 9 wherein said nylon yarn in the machine direction is a multifilament nylon yarn and wherein said ionomer-resin encapsulated nylon yarn in the cross-machine direction is a multifilament nylon yarn.

* * * * *